US011417296B2

(12) United States Patent
Saito et al.

(10) Patent No.: US 11,417,296 B2
(45) Date of Patent: Aug. 16, 2022

(54) INFORMATION PROCESSING DEVICE, INFORMATION PROCESSING METHOD, AND RECORDING MEDIUM

(71) Applicant: SONY CORPORATION, Tokyo (JP)

(72) Inventors: Mari Saito, Kanagawa (JP); Tsuyoshi Ishikawa, Kanagawa (JP); Ryo Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 16/978,267

(22) PCT Filed: Dec. 28, 2018

(86) PCT No.: PCT/JP2018/048394
§ 371 (c)(1),
(2) Date: Sep. 4, 2020

(87) PCT Pub. No.: WO2019/176236
PCT Pub. Date: Sep. 19, 2019

(65) Prior Publication Data
US 2020/0410960 A1  Dec. 31, 2020

(30) Foreign Application Priority Data
Mar. 13, 2018  (JP) .............................. JP2018-045141

(51) Int. Cl.
*G09G 5/37* (2006.01)
*G06F 3/01* (2006.01)
*H04S 7/00* (2006.01)

(52) U.S. Cl.
CPC ................ *G09G 5/37* (2013.01); *G06F 3/013* (2013.01); *H04S 7/303* (2013.01); *G09G 2354/00* (2013.01); *H04S 2400/11* (2013.01)

(58) Field of Classification Search
CPC ....... H04S 2400/11; H04S 7/303; G09G 5/37; G09G 2354/00; G06F 3/013
See application file for complete search history.

(56) References Cited

U.S. PATENT DOCUMENTS 7,227,567 B1    6/2007  Beck et al.
10,269,180 B2*  4/2019  Yamamoto ............ A63F 13/285
(Continued)

FOREIGN PATENT DOCUMENTS

CN    103765374 A    4/2014
CN    104982029 A    10/2015
(Continued)

OTHER PUBLICATIONS

International Search Report and Written Opinion of PCT Application No. PCT/JP2018/048394, dated Mar. 12, 2019, 09 pages of ISRWO.

*Primary Examiner* — Yu Chen
(74) *Attorney, Agent, or Firm* — Chip Law Group

(57) ABSTRACT

[Problem] An information processing device, an information processing method, and a recording medium that enable change in display of real space without being noticed by a communicatee are to be proposed. [Solution] An information processing device, including: a determining unit that determines a gazing state or a non-gazing state of a first user present in first real space, for a display object displayed by a display device of the first user, the display object being associated with second real space different from the first real space; and a display control unit that changes appearance of the display object when the gazing state has been changed to the non-gazing state.

18 Claims, 7 Drawing Sheets

(56) References Cited

U.S. PATENT DOCUMENTS

| | | | |
|---|---|---|---|
| 2006/0268101 A1* | 11/2006 | He | H04N 7/147 348/14.12 |
| 2008/0298571 A1 | 12/2008 | Kurtz et al. | |
| 2011/0234475 A1* | 9/2011 | Endo | G09G 3/001 345/8 |
| 2013/0271454 A1* | 10/2013 | Lyons | G06F 3/04897 345/419 |
| 2014/0002341 A1* | 1/2014 | Nister | G06F 3/013 345/156 |
| 2014/0176663 A1 | 6/2014 | Cutler et al. | |
| 2014/0361976 A1* | 12/2014 | Osman | G06T 19/006 345/156 |
| 2014/0364212 A1* | 12/2014 | Osman | A63F 13/537 463/31 |
| 2016/0240005 A1 | 8/2016 | Ur | |
| 2017/0358141 A1* | 12/2017 | Stafford | A63F 13/537 |
| 2018/0150204 A1* | 5/2018 | Macgillivray | G06F 3/04842 |
| 2018/0366091 A1* | 12/2018 | Han | G06F 3/01 |

FOREIGN PATENT DOCUMENTS

| | | |
|---|---|---|
| JP | 2010-529738 A | 8/2010 |
| JP | 2012-175136 A | 9/2012 |
| JP | 2012-213013 A | 11/2012 |
| JP | 2013-218597 A | 10/2013 |
| JP | 2014-532206 A | 12/2014 |
| JP | 2016-506669 A | 3/2016 |
| JP | 2017-509943 A | 4/2017 |
| KR | 10-2014-0057594 A | 5/2014 |
| KR | 10-2015-0097536 A | 8/2015 |
| WO | 2006/127177 A2 | 11/2006 |
| WO | 2008/153822 A2 | 12/2008 |
| WO | 2013/036236 A1 | 3/2013 |
| WO | 2014/100455 A1 | 6/2014 |
| WO | 2015/116183 A2 | 8/2015 |

\* cited by examiner

INFORMATION PROCESSING DEVICE, INFORMATION PROCESSING METHOD, AND RECORDING MEDIUM

CROSS REFERENCE TO RELATED APPLICATIONS

This application is a U.S. National Phase of International Patent Application No. PCT/JP2018/048394 filed on Dec. 28, 2018, which claims priority benefit of Japanese Patent Application No. JP 2018-045141 filed in the Japan Patent Office on Mar. 13, 2018. Each of the above-referenced applications is hereby incorporated herein by reference in its entirety.

FIELD

The present disclosure relates to an information processing device, an information processing method, and a recording medium.

BACKGROUND

In recent years, technology called augmented reality (AR) has attracted attention, for presentation of additional information superimposed on real space, to a user. According to this AR technology, information presented to a user may be visualized by use of virtual objects in various forms, such as text, icons, or animations. Furthermore, the information presented to a user, according to the AR technology, is normally displayed at a position associated with any one of real objects captured in an input image.

A technique for selectively improving visibility of desired information for a user has been disclosed in, for example, Patent Literature 1 cited below, with respect to control of information presented to users in such AR technology, the desired information being among many pieces of information provided through an AR application.

CITATION LIST

Patent Literature

Patent Literature 1: JP 2013-218597 A

SUMMARY

Technical Problem

However, although the conventional technique related to the control of information presented to users according to the AR technology enables a virtual object (an AR virtual object) to look natural as if the virtual object is a real object, when a real object is decorated or hidden by AR, the decoration or hiding is emphasized by the high visibility of the AR itself or by that sudden change, such as the sudden appearance of the AR, and the conventional technique is thus not appropriate for a case where one intentionally wants to hide himself or a real object in his own space from a communicatee.

Therefore, an information processing device, an information processing method, and a recording medium that enable change in display of real space without being noticed by a communicatee are proposed by the present disclosure.

Solution to Problem

According to the present disclosure, an information processing device is provided that includes: a determining unit that determines a gazing state or a non-gazing state of a first user present in first real space, for a display object displayed by a display device of the first user, the display object being associated with second real space different from the first real space; and a display control unit that changes appearance of the display object when the gazing state has been changed to the non-gazing state.

According to the present disclosure, an information processing method is provided, wherein a processor performs processing including: determining a gazing state or a non-gazing state of a first user present in first real space, for a display object displayed by a display device of the first user, the display object being associated with second real space different from the first real space; and changing appearance of the display object when the gazing state has been changed to the non-gazing state.

According to the present disclosure, a recording medium is provided that has, recorded therein, a program for causing a computer to function as: a determining unit that determines a gazing state or a non-gazing state of a first user present in first real space, for a display object displayed by a display device of the first user, the display object being associated with second real space different from the first real space; and a display control unit that changes appearance of the display object when the gazing state has been changed to the non-gazing state.

Advantageous Effects of Invention

As described above, according to the present disclosure, display of real space is able to be changed without being noticed by a communicatee.

The above mentioned effect is not necessarily limiting, and together with the effect, or instead of the effect, any of effects disclosed in this specification or any other effect that is able to be perceived from this specification may be achieved.

DESCRIPTION OF EMBODIMENTS

Preferred embodiments of the present disclosure will hereinafter be described in detail, while reference is made to the appended drawings. Redundant explanation will be omitted by assignment of the same reference sign to components having substantially the same functional configuration, throughout this specification and the drawings.

Furthermore, description will be made in the following order.

1. Outline of Information Processing System According to One Embodiment of Present Disclosure
2. Configuration
2-1. Configuration of Information Processing Terminal
2-2. Configuration of Server 20
3. Operation Processing
4. Supplements
5. Conclusion

1. OUTLINE OF INFORMATION PROCESSING SYSTEM ACCORDING TO ONE EMBODIMENT OF PRESENT DISCLOSURE

Figure 1:
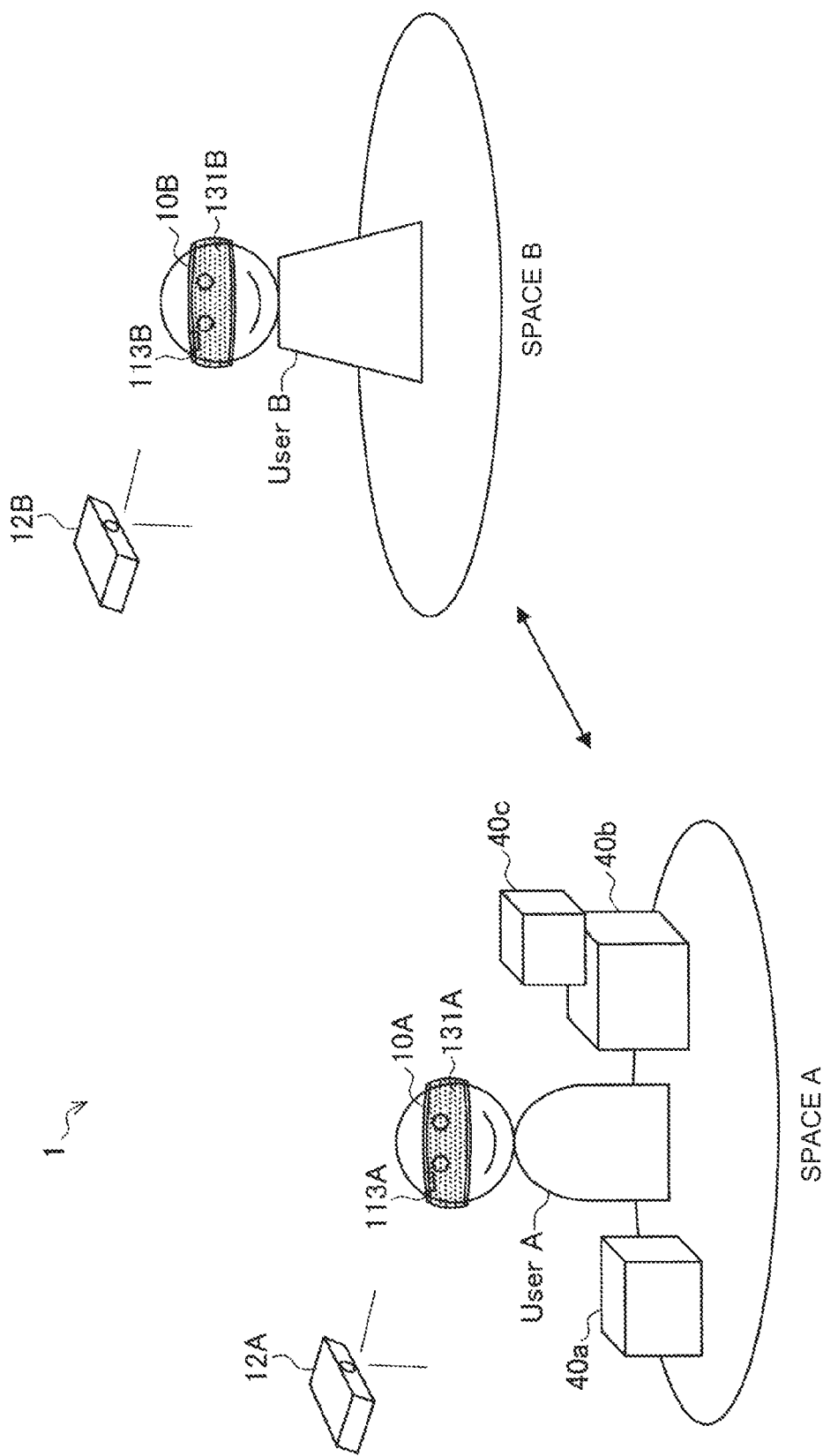
FIG. 1 is a diagram for explanation of an outline of an information processing system according to an embodiment of the present disclosure.

FIG. 1 is a diagram for explanation of an outline of an information processing system according to an embodiment of the present disclosure. An information processing system 1 according to the embodiment realizes communication between a user A present in space A and a user B present in space B, and includes, for example, as illustrated in FIG. 1: an information processing terminal 10A implemented by a head mounted display (HMD) or the like, which is mounted on the head of the user A present in the space A and has input and output functions; and an information processing terminal 10B implemented by an HMD or the like mounted on the head of the user B present in the space B. The information processing system 1 may further include an external camera 12 that captures a video (the appearance of a room, for example) in space including a user. Furthermore, the information processing system 1 according to the embodiment may further include a server 20 connected to the information processing terminal 10A and the information processing terminal 10B, via a network.

The information processing system 1 according to the embodiment acquires information on the space A (for example, an image and sound) by means of an external camera 12A and various sensors provided in the information processing terminal 10A and outputs the information, from the information processing terminal 10B, to the user B present in the space B. Furthermore, the information processing system 1 acquires information on the space B (for example, an image and sound) by means of an external camera 12B and various sensors provided in the information processing terminal 10B and outputs the information, from the information processing terminal 10A, to the user A present in the space A. As a result, two-way communication between the user A and the user B is implemented in real time.

Various methods may be supposed for making users appear to each other in two-way communication according to the embodiment. Firstly, as illustrated in FIG. 1, as one example of the information processing terminal 10 according to the embodiment, a case where an HMD of a head mounting type is used will be supposed. An HMD broadly denotes a display device of the head mounting type, and may have, for example, a shape to cover a head by means of a mounting unit, such as a headband, or a spectacle-shape supported by ears. The type of display may be: a non-transmissive type (also referred to as an immersive HMD) that covers all of the view with a display unit; a video transmissive type (also referred to as a video see-through HMD) that covers all of the view with a display unit, captures an image of how the exterior appears by means of an outward camera, and displays the image on the display unit; a so-called optical see-through type by which an image is displayed superimposed on real space in a state where the external environment is able to be visually recognized by means of a display unit having optical transparency; or a retinal projection type that projects an image toward eyes of a user by means of a projecting unit (corresponding to a projector) held in front of the eyes of the user. Furthermore, the HMD is not necessarily a display that presents an image to both eyes, but may be a display that presents an image to only one eye.

The immersive type is able to increase immersiveness by further covering ears by means of headphones or the like to block information on the external environment and is preferably used for virtual reality (VR). Furthermore, the see-through type and the retinal projection type allow a user to live in a state of routinely wearing the HMD and is preferably used for augmented reality (AR), like in a case where information related to a real object that is present in front of the eyes of a user is to be presented.

An HMD, for which any of the various display types described above may be used, is provided with, for example: an outward camera that captures an image of the external environment; an inward camera that captures an image of the face or eyes of a person wearing the HMD; a line-of-sight sensor (such as an infrared sensor or an ocular potential sensor, where an outward/inward camera may be used as the line-of-sight sensor); and/or a gyro/accelerator-sensor.

Furthermore, various methods may be supposed for making users appear to each other in the two-way communication in the information processing system 1 according to the embodiment. For example, when the information processing system 1 displays a video of a room including the user A, on a display unit of the information processing terminal 10B of the user B, the video having been captured by the external camera 12A, the information processing system 1 may extract a predetermined object (a real object), such as the user A or a chair the user A is seated, from the captured video, and display the predetermined object superimposed on the space B, on a display unit of the optical see-through type of the information processing terminal 10B worn by the user B (for so-called AR, where the object to be displayed superimposed may be a 3D image, for example). As a result, the user B is able to communicate with the user A, as if the user A is present in the space B. Or, the information processing system 1 is able to provide immersiveness as if the user B and the user A are staying together in the space A, by displaying a video of a room including the user A captured by the external camera 12A, on the information processing terminal 10B of an HMD of the non-transmissive type worn by the user B and covering the user view.

Figure 2:
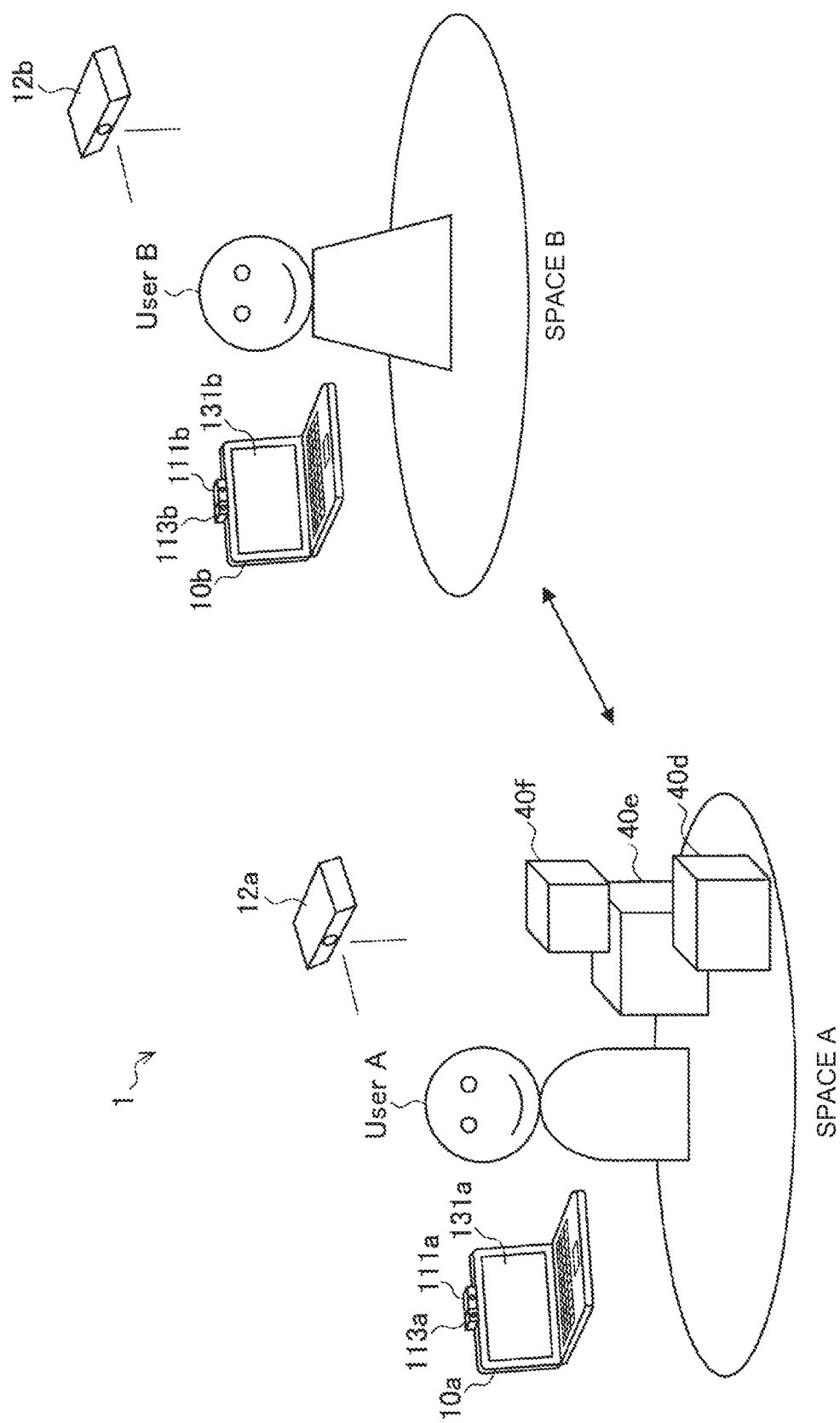
FIG. 2 is a diagram for explanation of another example of a system configuration of the information processing system according to the embodiment of the present disclosure.

Furthermore, the information processing terminal 10 is not necessarily an HMD as described above, and various display devices, such as, for example, a PC, a notebook PC, a television device, a smartphone, a tablet terminal, a portable telephone terminal, and a projector may be supposed. FIG. 2 illustrates another example of the system configuration according to the embodiment. As illustrated in FIG. 2, for example, information on space B (an image and sound) is output at an information processing terminal 10*a* by means of a notebook PC or the like present in space A, and information on the space A (an image an sound) is output at an information processing terminal 10*b* by means of a notebook PC or the like present in the space B. Information on space may be acquired by various sensors (a camera and a microphone) provided in an information processing device 10 or an external camera 12*a*. Specifically, a video of space including a user may be acquired by a camera 111 provided in the information processing terminal 10, for example.

Real objects 40*a* to 40*f* present around a user A included in a video of the space A may be not wished to be seen by a user B when the video of the space A where the user A is present is presented at the information processing terminal 10B present in the space B, for example. For example, when a user's home and the user's office are connected via videos in telework (also referred to as telecommuting, meaning a form of work where the user works from home or the like via the Internet), a video of the home (the appearance of the user's room captured in the background or the like of the user) that is private space is transmitted to the office, and something not desired to be seen by people at the office, for example, scattered laundry or what the user's children are doing, may be seen. Furthermore, putting on makeup for just a meeting of about one hour in telework may be bothersome.

AR technology has been proposed, for example, as the above described conventional technology for superimposed display of a display object in real space, but a boundary surface of an AR object is conspicuous, the AR object itself is generated for the purpose of drawing attention of a user, and AR technology has thus not been suitable for uses, such as a use for hiding a part of real space.

Furthermore, sudden appearance of an AR object at a part desired to be hidden rather stands out due to the change in the display and is not desirable. For a user, a communicatee desirably does not notice any hiding or decorating per se.

Therefore, the information processing system 1 according to the present disclosure enables display of real space to be changed (decorated for hiding) without a communicatee noticing the change, by (gradually) changing the appearance of a display object associated with real space while the communicatee is not paying close attention to the display object.

Furthermore, the information processing system 1 according to the present disclosure more infallibly enables display of real space to be changed without a communicatee noticing the change, by changing the appearance of a display object to be decorated after distracting the communicatee's attention from the display object by purposely displaying an attracting object that attracts the communicatee's line of sight.

If the information processing terminal 10 is of the display type like an HMD as illustrated in FIG. 1, for example, a line-of-sight of a user is able to be recognized based on data sensed by a line-of-sight sensor 113 or the like provided in the HMD. Although details of a method of recognizing a line of sight will be described later, for example, a line of sight may be recognized from movement of eyeballs or the like by use of an infrared sensor or an ocular potential sensor, which is an example of the line-of-sight sensor 113. Or, a line of sight may be recognized from a face orientation, a head direction, or the like by use of the camera 111 (outward/inward camera) or a gyro/accelerator-sensor (not illustrated in the drawings), or the like provided in the HMD.

If the information processing terminal 10 is of the display type like a notebook PC as illustrated in FIG. 2, for example, a line of sight of a user is able to be recognized based on data sensed by a line-of-sight sensor 113 provided in the notebook PC, an external camera 12, or the like. For example, a line of sight of a user may be recognized from a positional relation between a pupil point and a reflection point (a Purkinje image), based on a captured image captured in a state where the reflection point has been made on the cornea of the eye by emission of infrared light to the user looking at the screen of the notebook PC. Furthermore, an image of the face of a user may be captured by a camera 111 provided in the notebook PC or the external camera 12 and a line of sight may be recognized from the orientation of the face.

The outline of the information processing system 1 according to the embodiment has been described above. Not all of the information processing terminals 10 used by users performing the two-way communication according to the embodiment may be of the same display type. For example, while a user A may use a notebook PC, a user B may use a see-through type HMD.

Figure 3:
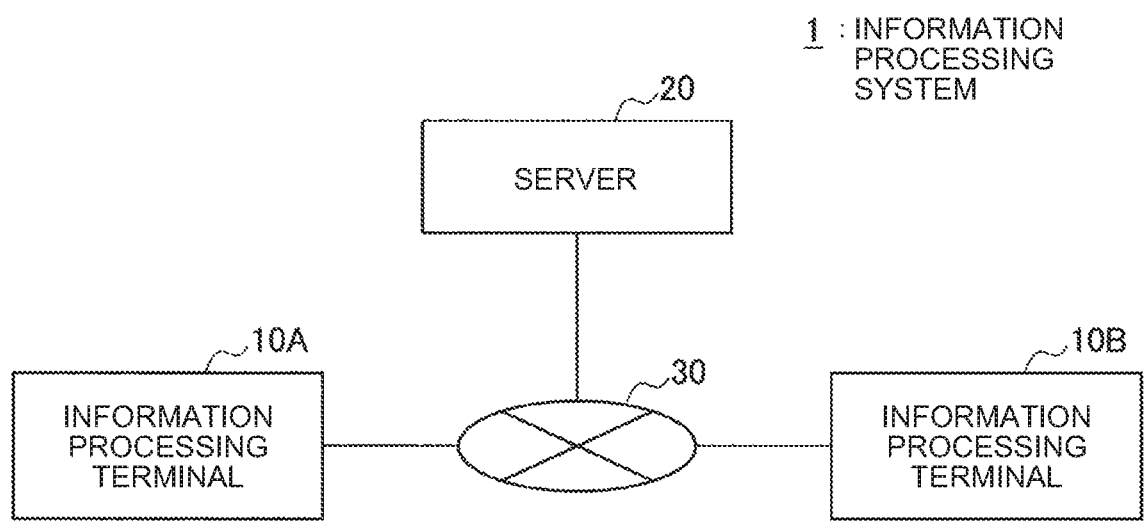
FIG. 3 is a diagram illustrating an example of a configuration of the information processing system according to the embodiment of the present disclosure.

Next, an example of a system configuration of the information processing system 1 according to the embodiment is illustrated in FIG. 3. As illustrated in FIG. 3, the information processing system 1 includes an information processing terminal 10A that controls input and output of information to and from space A, an information processing terminal 10B that controls input and output of information to and from space B, and a server 20 that performs decoration control when information is output in each space. The information processing terminal 10A, the information processing terminal 10B, and the server 20 are connected to one another via a network 30. With respect to this embodiment, the system configuration for implementing communication between two users A and B is described as an example, but the present disclosure is not limited to this system configuration and a system configuration for implementing communication among three users or more may be adopted.

An information processing terminal 10 includes an input unit 110 and an output unit 130, and performs control for: transmitting spatial information acquired from the input unit 110, to a connection destination; and outputting, from the output unit 130, spatial information on the connection destination received from the connection destination. The transmission and reception of the spatial information may be performed via the server 20, the transmission and reception may be performed directly to and from the connection destination, or the transmission and reception may be performed to and from both the server 20 and the connection destination. Furthermore, the information processing terminal 10 may be formed of plural devices. For example, the input unit 110 or the output unit 130 may be configured to be implemented by a device separate from the information processing terminal 10 and to be connected to the information processing terminal 10 wiredly or wirelessly. For example, the input unit 110 may be implemented by a camera device, the output unit 130 may be implemented by an HMD, the information processing terminal 10 may be implemented by a stationary dedicated terminal, and the information processing terminal 10 may be configured to be connected to the camera device and the HMD wiredly or wirelessly.

The server 20 is, for example, a cloud server, and performs decoration control for a display object, as appropriate, when information on a communicatee's space is output to each space. In this specification, a "display object" is a real object in real space captured in an image and examples of a display object include a user and an object present in real space.

Hereinafter, a specific configuration of each device included in the information processing system 1 according to the embodiment will be described by reference to the drawings.

2. CONFIGURATION

2-1. Configuration of Information Processing Terminal 10

Figure 4:
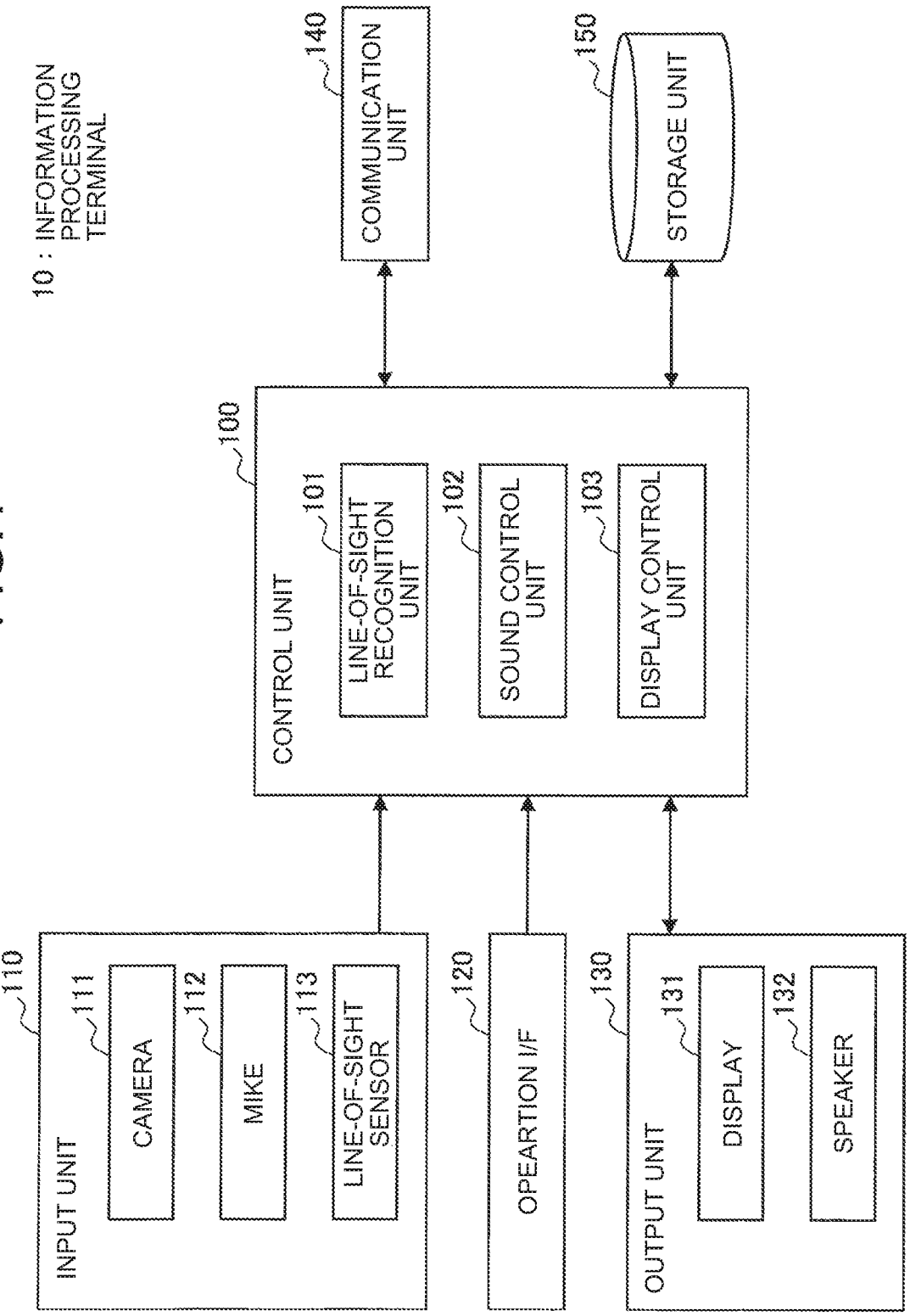
FIG. 4 is a block diagram illustrating an example of a configuration of an information processing terminal according to the embodiment of the present disclosure.

FIG. 4 is a block diagram illustrating an example of a configuration of an information processing terminal 10 according to the embodiment. As illustrated in FIG. 4, the information processing terminal 10 has a control unit 100, an input unit 110, an operation interface (I/F) 120, an output unit 130, a communication unit 140, and a storage unit 150.

Control Unit 100

The control unit 100 functions as an arithmetic processing device and a control device, and controls the overall operation in the information processing terminal 10 according to various programs. The control unit 100 is implemented by an electronic circuit, such as a central processing unit (CPU) or a microprocessor, for example. Furthermore, the control unit 100 may include: a read only memory (ROM) that stores therein programs, arithmetic parameters, and the like to be used; and a random access memory (RAM) that temporarily stores therein parameters and the like that change as appropriate.

The control unit 100 according to the embodiment also functions as a line-of-sight recognition unit 101, a sound control unit 102, and a display control unit 103.

The line-of-sight recognition unit 101 recognizes at least one of a line-of-sight direction and a gaze point of a user in space, and outputs a result of the recognition to the server 20. For example, the line-of-sight recognition unit 101 tracks the line of sight of the user looking at a display 131. A method of recognizing the line of sight is not particularly limited, but a method described below may be used, for example.

Firstly, if the information processing terminal 10 is implemented by an HMD as illustrated in FIG. 1, the line-of-sight recognition unit 101 may detect a line of sight of a user that is a person wearing the HMD, by means of a sensor provided in the information processing terminal 10. For example, the line-of-sight recognition unit 101 may recognize, as a direction of a line of sight of the user, an orientation of a front camera (a camera 111) that is provided in the information processing terminal 10 and is for recognizing the environment. Furthermore, the line-of-sight recognition unit 101 may recognize a line of sight from movement of the eyeballs by analyzing a captured image of the eyes of the user captured by, for example, an infrared sensor (an infrared light source and an infrared camera (an optical sensor)) that is an example of a line-of-sight sensor 113. More specifically, for example, the line-of-sight recognition unit 101 may recognize a line of sight of the user by acquiring positions and movement of the pupils or irises and a positional relation between the pupil positions and the Purkinje images. Furthermore, the line-of-sight recognition unit 101 may recognize a line-of-sight direction by perceiving movement of the eyeballs by analyzing ocular potential values sensed by an ocular potential sensor that is an example of the line-of-sight sensor 113, for example.

Furthermore, if the information processing terminal 10 is implemented by a notebook PC or the like as illustrated in FIG. 2, the line-of-sight recognition unit 101 may recognize, by means of the line-of-sight sensor 113 or the camera 111 provided in the information processing terminal 10, a line of sight (a line-of-sight direction, a gaze point on the display 131, or the like) of a user looking at the display 131 of the information processing terminal 10. For example, the line-of-sight recognition unit 101 recognizes a line-of-sight direction from an orientation of the user's face/head by analyzing a captured image captured by the camera 111. In addition, the line-of-sight recognition unit 101 may recognize, by means of an infrared sensor that is an example of the line-of-sight sensor 113, a line-of-sight from a positional relation between pupil positions and Purkinje images (reflection points on corneas by irradiation with infrared light) by analyzing a captured image of the eyes of the user.

The sound control unit 102 performs control for outputting sound from a speaker 132 of the output unit 130. The display control unit 103 performs control for displaying an image on the display 131 of the output unit 130. For example, the sound control unit 102 and the display control unit 103 performs control for outputting sound and a video of a communicatee's space received from the server 20, from the speaker 132 and the display 131.

Furthermore, the control unit 100 according to the embodiment performs control for transmitting a captured image and sound information acquired from the input unit 110, to the server 20 or the information processing terminal 10 at a connection destination, via a network 30, from the communication unit 140.

Input Unit 110

The input unit 110 has a function of inputting spatial information. For example, the input unit 110 includes the camera 111, a microphone (hereinafter, referred to as the mike) 112, and the line-of-sight sensor 113. The camera 111 is, for example, an outward camera provided in an HMD, and captures a video of the surroundings. A plurality of the cameras 111 may be provided. The mike 112 acquires the surrounding sound. The mike 112 may be a mike array formed of plural mikes.

The line-of-sight sensor 113 is a sensor for sensing data used in recognition of a line-of-sight of a user, and is implemented by, for example, an infrared sensor (an infrared LED and an infrared camera) or an ocular potential sensor.

Operation I/F 120

The operation I/F 120 receives input of operation from a user, for output to the control unit 100. The operation I/F 120 may be implemented by any of a keyboard, a mouse, a touch panel, buttons, switches, and the like.

Output Unit 130

The output unit 130 has a function of presenting various types of information output from the control unit 100, to a user. For example, the output unit 130 has the display 131 and the speaker 132. The display 131 displays thereon a video of the other user (a user present in remote space). The speaker 132 reproduces voice of the other user.

Communication Unit 140

The communication unit 140 is connected to another information processing terminal 10 and/or the server 20 via the network 30 and performs transmission and reception of data. For example, the communication unit 140 transmits a captured image captured by the camera 111 and sound data acquired by the mike 112, to the information processing terminal 10 at the communication destination and/or the server 20. Furthermore, the communication unit 140 receives a video, sound data, and the like from the information processing terminal 10 at the communication destination and/or the server 20.

Storage Unit 150

The storage unit 150 is implemented by a read only memory (ROM) that stores therein programs and parameters for the control unit 100 to execute various functions and a random access memory (RAM) that temporarily stores therein parameters and the like that change as appropriate. Furthermore, the storage unit 150 according to the embodiment may store therein data transmitted and received via the communication unit 140.

The configuration of the information processing terminal 10 according to the embodiment has been described specifically above. The configuration illustrated in FIG. 3 is an example, and the configuration of the information processing terminal 10 according to the embodiment is not limited to this example. For example, the information processing terminal 10 may be formed of plural devices. Specifically, at least one of the input unit 110 and the output unit 130 may be implemented by another device.

2-2. Configuration of Server 20

Figure 5:
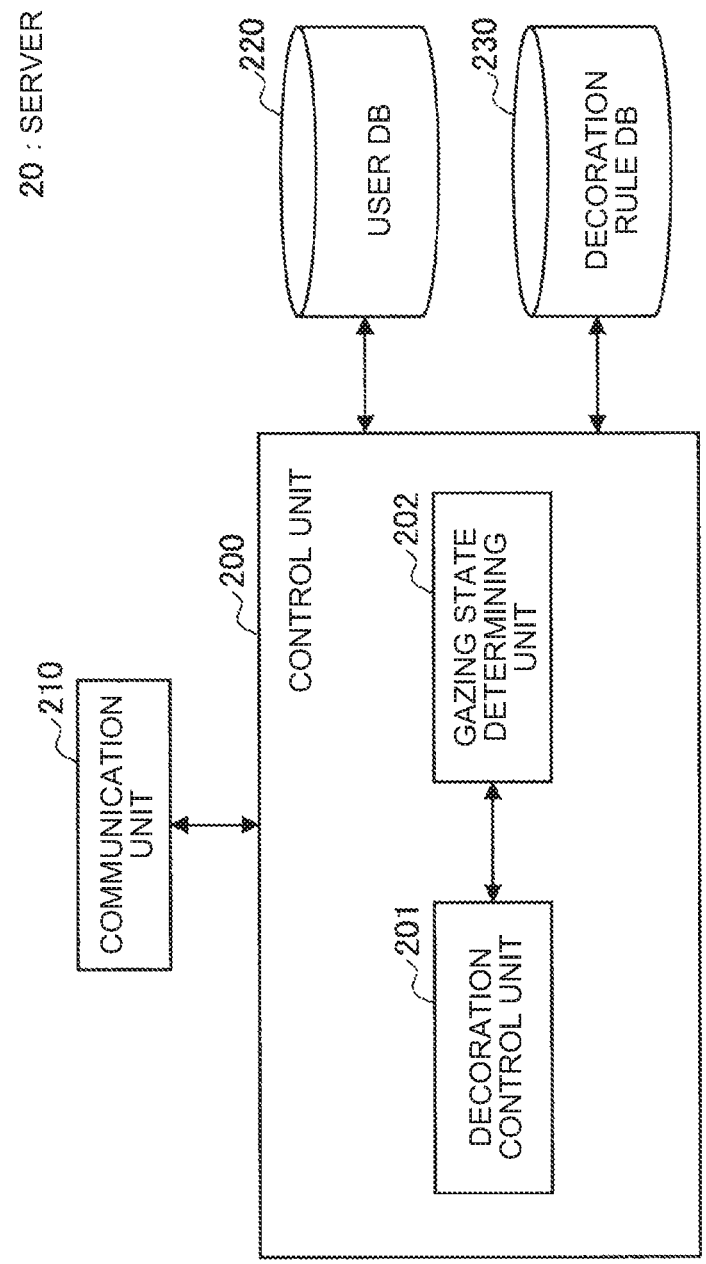
FIG. 5 is a block diagram illustrating an example of a configuration of a server according to the embodiment of the present disclosure.

FIG. 5 is a block diagram illustrating an example of a configuration of the server 20 according to the embodiment. As illustrated in FIG. 5, the server 20 (an information processing device) has a control unit 200, a communication unit 210, a user database (DB) 220, and a decoration rule DB 230.

Control Unit 200

The control unit 200 functions as an arithmetic processing device and a control device, and controls the overall operation in the server 20 according to various programs. The control unit 200 is implemented by an electronic circuit, such as a central processing unit (CPU) or a microprocessor, for example. Furthermore, the control unit 200 may include: a read only memory (ROM) that stores therein programs, arithmetic parameters, and the like to be used; and a random access memory (RAM) that temporarily stores therein parameters and the like that change as appropriate.

Furthermore, the control unit 200 according to the embodiment also functions as a decoration control unit 201 and a gazing state determining unit 202.

The decoration control unit 201 performs control for changing the appearance of a display object associated with real space to be presented to a communicatee. Because a captured image having the real space captured therein is presented to the communicatee in real time, when a user moves or the camera angle is changed, something that is not wished to be seen may be captured in the captured image. Furthermore, a user may not want her face without makeup to be seen but may find it too bothersome to put on makeup just for short time communication. The decoration control unit 201 according to the embodiment may perform decoration of a video of real space, the decoration including hiding such a part not wished to be seen by a communicatee or putting on virtual makeup on a user's face. In addition, the decoration control unit 201 is characterized in that the decoration control unit 201 performs decoration without being noticed by a communicatee by gradually making change according to the communicatee's gazing region or the like to avoid being noticed by the communicatee due to a sudden change, when performing decoration. That is, the decoration control unit 201 may perform control for changing the appearance of a display object that is displayed by a display device of a first user present in first real space and associated with second real space different from the first real space when the first user is brought into a non-gazing state from a gazing state, based on a result of determination of the gazing state or non-gazing state of the first user for the display object. What decoration is to be performed under what conditions is determined based on decoration rules preset in the decoration rule DB 230, for example.

Some of specific examples of decoration control performed based on the decoration rules will now be described.

(1) Decoration Control According to Gazing Region

For example, the decoration control unit 201 performs control for changing the appearance of a display object (for example, a captured image of a real object present in the space A illustrated in FIG. 1) associated with a user's space (for example, the space A) and displayed by a display device (for example, the display 131) in a communicatee's space (for example, the space B illustrated in FIG. 1) where the communicatee (for example, the user B illustrated in FIG. 1) is present, when a gazing state of the communicatee changes to a non-gazing state for the display object. By changing the appearance while the communicatee is not looking, the decoration is able to be performed without being noticed by the communicatee. The gazing state and non-gazing state of the communicatee are determined by the gazing state determining unit 202 described later.

Furthermore, by the decoration control unit 201 performing decoration little by little by gradually changing the appearance of the display object every time the gazing state is changed to the non-gazing state, the communicatee is able to be prevented more infallibly from noticing the decoration. In addition, the decoration control unit 201 may gradually increase the amount of change to the appearance of the display object according to elapse of time. By starting from a small change, the communicatee is able to be prevented from noticing the change to the utmost. Furthermore, the decoration control unit 201 may make the change inconspicuous by gradually making the change from a boundary surface of the display object. In addition, the decoration control unit 201 may make the change to the boundary surface inconspicuous by changing a region other than the display object, the region being in the vicinity of the boundary surface of the display object (that is, the surroundings of the display object). For example, by making the color of the region around the display object closer to the color of the boundary surface of the display object and also making the color of the boundary surface of the display object closer to the color of the surrounding region, the change in color at the boundary surface is made small.

Furthermore, the decoration control unit 201 may perform decoration of a display object after directing a communicatee's attention to an attracting object for attracting the communicatee's line of sight by displaying the attracting object at a position spaced apart from the display object. As a result, the gazing state of the communicatee for the display object is able to be brought into the non-gazing state and the appearance of the display object is even more infallibly able to be changed without being noticed by the communicatee. The attracting object may be, for example: a predetermined character image or an agent image; a virtual object, such as an interior decoration or an ornament that shines and/or moves; or a message with enhanced decorativeness or a notification to the communicatee. Furthermore, a method of attracting the communicatee's line of sight is not limited to the presentation of this attracting object, and brightness, chroma, luminance, or the like of a region for attracting attention (that is, an attracting region, preferably a region spaced apart from the display object) may be temporarily increased (increased in visual attraction).

Figure 6:
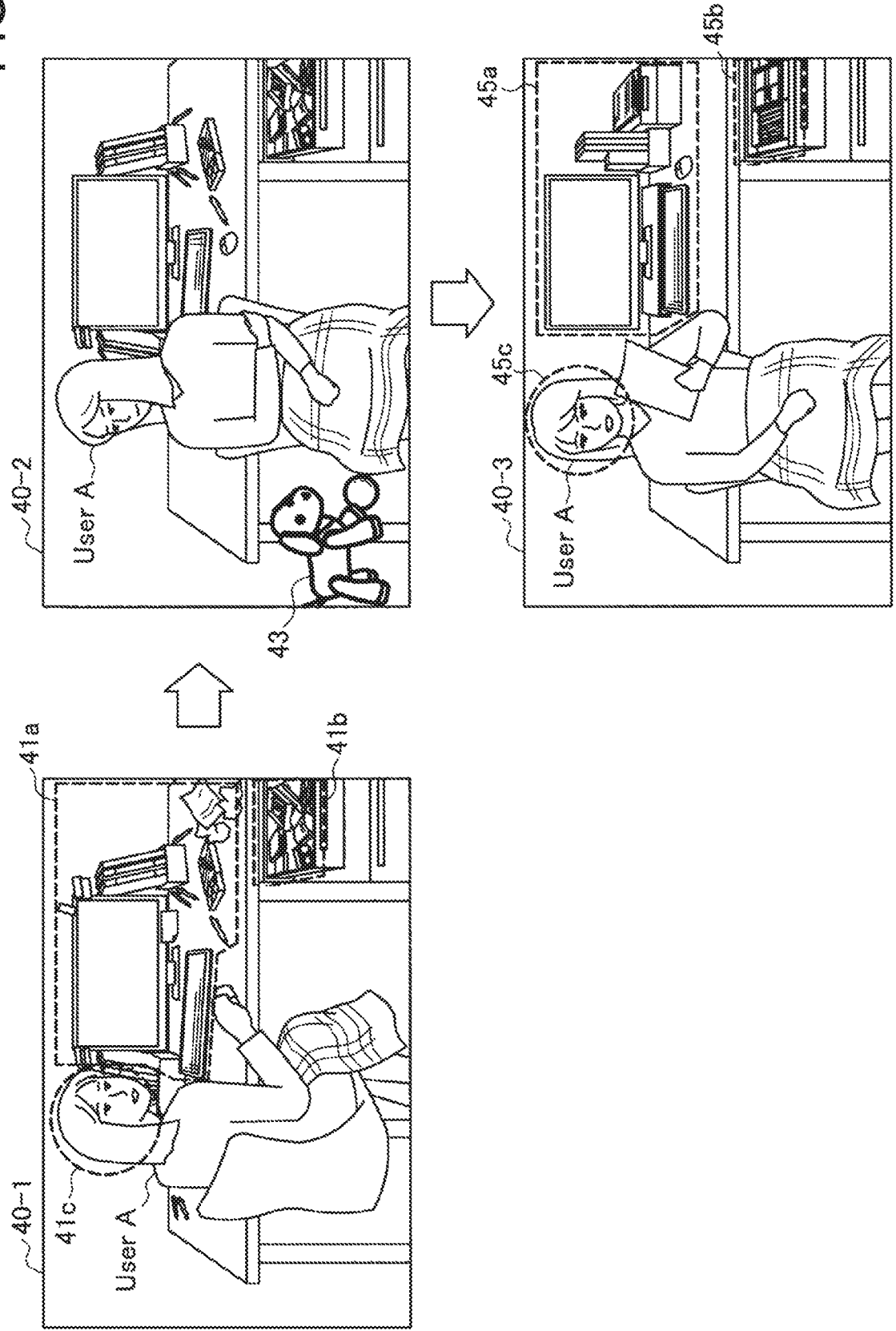
FIG. 6 is a diagram for explanation of an example where the appearance of a display object to be decorated is changed after a communicatee's line of sight is diverted by use of an attracting object in decoration control according to the embodiment of the present disclosure.

The decoration control according to the embodiment will be specifically described by reference to FIG. 6. FIG. 6 is a diagram for explanation of an example where the appearance of a display object to be decorated is changed after a communicatee's line of sight is diverted by use of an attracting object in the decoration control according to the embodiment of the present disclosure. In the example illustrated in FIG. 6, communication between a user A present in space A and a user B present in space B is supposed. Furthermore, images 40-1 to 40-3 illustrated in FIG. 6 are a video acquired by an external camera 12a, for example, from the space A and output at a display device (an information processing terminal 10B) present in the space B.

Although the external camera 12a is used as an example, the embodiment is not limited to this example, and the video may be acquired by a camera 111a of an information processing terminal 10a. Furthermore, sound may be acquired by a mike 112a or the like.

As depicted in the image 40-1 in FIG. 6, in a case where untidy desk and drawer (display objects 41a and 41b) are captured in the background of the user A, it is desirable for the user A if these desk and drawer are naturally hidden. A case may be supposed, where these display objects 41a and 41b desired to be hidden were invisible by being hidden by the user A's body at the start of communication, for example, but have become visible by movement of the user. Furthermore, a situation may be supposed, where: the first communicatee (for example, a colleague) is a person who does not mind about the appearance of the user A and the state of the room and there was thus no need to hide them, but another communicatee who joins them from the middle of the communication (for example, a boss) is a person who minds about the appearance of the user A and the state of the room and there are thus things, which are unfavorable to be visible and are parts already visible to the first communicatee already connected; and when these things are suddenly hidden with a virtual image, strangeness may be created instead. In addition, if the user A does not want a communicatee to see the user A's bed hair, appearance, and face without makeup, it is desirable to decorate (put virtual makeup on) a display object 41c corresponding to the face of the user A, but if decoration through a sudden change is performed, the communicatee may notice that the makeup has been put virtually.

Therefore, according to this embodiment, as depicted in the image 40-2 in FIG. 6, an attracting object 43 is displayed at a position spaced apart from the display objects 41a to 41c and attracts the communicatee's (for example, the user B's) line of sight. The communicatee's line of sight is recognized by, for example, the information processing terminal 10B, based on data resulting from sensing of the user B's line of sight to the image 40-1 being displayed on a display 131b of the information processing terminal 10B, for example, by means of a line-of-sight sensor 113b or a camera 111b. The attracting object 43 may be a character image or an agent image, and preferably draws attention of the communicatee by moving and/or generating sound. Furthermore, the attracting object 43 may be a character image or an agent image that the communicatee is likely to be interested, according to information on tastes and preferences of the communicatee.

After attracting the communicatee's line of sight away from a region to be decorated, the decoration control unit 201 of the server 20 starts decoration (change of the appearance) of the display objects 41a to 41c. Supposed examples of the decoration control include: image processing for erasing trash scattered on a desk, disorderly pens and sticky notes, printed documents, and/or the like, and/or for correcting the position of a keyboard; and superimposed display of an image of the usual desk (the desk in a clean state) acquired beforehand or an image of the desk at the time of usual communication (the desk being clean at the time of communication). Furthermore, the decoration control unit 201 may add foundation, blush, eyebrow makeup, eye makeup, and lipstick; remove freckles and/or wrinkles; perform whitening processing; and/or the like, to reproduce the usual face with makeup, based on a facial image of a user with makeup, the facial image having been acquired beforehand.

Such decoration (change of the appearance) may be performed gradually by time being taken. For example, the decoration control unit 201 may gradually make change every time the communicatee's line of sight is diverted, instead of executing all of the change as the communicatee's line of sight is diverted once. Furthermore, when there are plural display objects, the decoration control unit 201 may start decoration control simultaneously, or may make changes in order from a display object that is at a place where the communicatee's attention is more difficult to be directed (for example, a region at an end of the screen, a region spaced apart from the communicatee's gaze point, a region far in the depth direction, an object that looks familiar to the communicatee, or an object having visual attraction less than the other objects).

As depicted in the image 40-3 in FIG. 6, the display objects 41a and 42b that have been changed to states where the desk and the drawer are clean, and the display object 41c having makeup on the face of the user A are finally displayed.

The specific content of the decoration control has been described hereinbefore by reference to FIG. 6.

Furthermore, the decoration control unit 201 may detect (estimate) a region to which a communicatee's attention is not directed, and make a change from that region (if decoration has been determined to be needed). As to the "detection of the region to which the communicatee's attention is not directed", the following method may be adopted, other than a result of the above described determination of the gazing state and the non-gazing state based on the recognition of the actual communicatee's line-of-sight.

For example, if an object present in space is already known by a communicatee and does not change, it is assumed that the communicatee will not pay attention to the object and will be unlikely to notice any change. Therefore, if an object present in space is already known and does not change (for example, if a user is always in the same room), the decoration control unit 201 may estimate the order of ease of attracting the communicatee's attention and make changes from the lowest rank in that order. Determination of an object/region that is easy to attract the attention of a communicatee may be performed by use of an algorithm based on, for example, "Relations Between Obstructive Stimuli and Target Stimuli in Visual Search Problems (Jeremy Wolfe and Todd S. Horowitz (2008), Scholarpedia, 3(7):3325.)"

Furthermore, the decoration control unit 201 may also detect, as the "region to which the communicatee's attention is not directed", a region having a long spatial distance from the gaze point of the communicatee, or a region at a long distance in the depth direction, and make changes in order from that region. In addition, the decoration control unit 201 may estimate the visual attraction, according to the colors, sizes, shapes, display positions and the like of objects, and make changes in order from the object having the lowest visual attraction. For example: for humans, parts other than their "faces"; and for objects, small objects, objects with inconspicuous colors, and objects displayed at ends of the angle of view, are assumed to be low in visual attraction.

(2) Decoration Control According to Affinity

Furthermore, the decoration control unit 201 may control the amount of change for change of the appearance, according to the elapsed time from the time a communicatee saw the display object (or the real object) before. For example, if the elapsed time is longer than a predetermined value, that display object is an object that does not look familiar to the communicatee and there is also a possibility that the communicatee has the impression that he has seen the object before, and it is thus considered to be easy for the communicatee to notice any change or a difference from the one before. Therefore, the decoration control unit 201 changes the appearance of the display object slowly by taking more time.

On the contrary, a communicatee is considered unlikely to direct her attention to a display object that looks familiar to him, a display object small in visual attraction, or a generic display object, and the decoration control unit 201 may thus change such a display object in a short time.

Information related to display objects that look familiar to a communicatee, or the like may be acquired from the user DB 220.

(3) Individuation of Degree of Change

Some people are sensitive to change and some people are particular about and interested in specific characteristics, and thus some people are considered to be likely to notice change. In view of such assumption, the decoration control unit 201 may adjust the degree of change (the amount of change) to a display object according to characteristics of the individual. Information on each user's tastes, preferences, sensitivity to change, and the like may be acquired from the user DB 220. The control unit 200 may estimate a user's interests and what the user is particular about, from the user's usual words, movement of the user's line of sight in communication, and the like, and store them into the user DB 220. For example, if a user frequently refers to changes to hairstyles and outfits, the user may be assumed to be "a person sensitive to changes to hairstyles and outfits" or "a person interested in hairstyles and outfits". Furthermore, if a user frequently refers to objects in space, such as interior decorations, the user may be assumed to be "a person sensitive to changes to interior decorations". In addition, if the frequency of a user gazing at the outfits or the surroundings at the start of communication or in a conversation is equal to or higher than a given frequency, the user may be assumed to be a person sensitive to changes to outfits and the surroundings. Furthermore, each user may be caused to input beforehand, as user information, what the user is interested in, tastes and preferences, and the like.

Furthermore, a user may set characteristics of a communicatee. For example, a user herself may determine that one person is sensitive to interior decorations and another person is sensitive to outfits, from the user's usual conversations with these people, and set these characteristics. The decoration control unit 201 makes adjustment such that for a display object that interests a communicatee or the communicatee is particular about, the display object is changed more gently, so as not to be noticed by the communicatee as far as possible.

(4) Control for Change in Color and Shape

The decoration control unit 201 may predict beforehand a place where a conspicuous change is likely to occur due to the color, shape, and the like of a display object to be decorated, and make the change inconspicuous or exclude the display object from the angle of view by dynamically changing the camera angle or the background.

For example, if a user looks pale, has a scar on her face because of an injury, or her room is untidy, the face or the room is likely to draw the attention of a communicatee and change to the face or room tends to become conspicuous. In this case, the decoration control unit 201 changes the color of the surroundings (background) of the display object such that change to the color and/or shape of the display object becomes inconspicuous, and thereafter changes the display object (for example, changes the facial complexion or erases the injury on the face) to make the change to the display object inconspicuous as far as possible.

Furthermore, if some camera angles are selectable, the decoration control unit 201 may select an angle at which a region not desired to attract attention becomes inconspicuous or is excluded from the angle of view. For example, when a user is moving and being tracked by plural cameras arranged around the user and images of the user are being presented to a communicatee in real time, the decoration control unit 201 predicts the possibility that a part not desired to be seen by the communicatee will be captured in the images (which may be determined by prediction of a movement path of the user), the part being, for example, an untidy part of the room or an unclean part of the kitchen. If the decoration control unit 201 determines, from the movement path of the user, that the possibility that the part not desired to be seen by the communicatee will be captured in the images is high, the decoration control unit 201 changes the camera angle to another camera angle at which the region not desired to attract attention becomes inconspicuous or is excluded from the angle of view. In addition, if a user who usually wears makeup has started communication without wearing makeup, the decoration control unit 201 may perform control such that a zoomed out video is presented to the communicatee to make the region not desired to attract attention inconspicuous.

(5) Method for Change

As described above, the decoration control unit 201 prevents change of a boundary surface of a display object from being conspicuous and a communicatee from noticing the change, by changing the display object gradually. Furthermore, the decoration control unit 201 may prevent the change to the display object from being conspicuous by gradually making the change from the boundary surface of the display object toward the center.

Furthermore, the decoration control unit 201 may control display to blur a boundary surface of a display object to blend the boundary surface into the surroundings (background).

Furthermore, for a display object that is likely to be inevitably conspicuous and has visual attraction (determined to be higher than a predetermined value of visual attraction based on the color, shape, size, and the like), the decoration control unit 201 may divert a communicatee's line of sight from the display object by displaying an attracting object that is even higher in visual attraction. The attracting object may be a character image or an agent image as mentioned above, or even a conspicuous interior decoration or ornament, a poster, wallpaper, or the like. The decoration control unit 201 performs control for changing the appearance of a display object while displaying such an attracting object high in visual attraction.

(6) Trigger for Change

Next, examples of conditions for the decoration control by the decoration control unit 201 (in what cases the decoration control is performed) will be described.

When there is Difference from the Usual

For example, if a user is in a situation different from the usual situation for a communicatee whom the user routinely performs communication via a network (for example, if the user's room is untidy, the user does not feel well and looks pale, the user does not wear makeup, or the user has not prepared her body), the decoration control unit 201 performs decoration. When performing communication via a network, the decoration control unit 201 may analyze a video of a user to be presented to a communicatee, determine whether or not the video deviates from a given trend (the user's usual trend)

by a predetermined degree or more, and perform decoration if the video deviates from the certain trend by the predetermined degree or more. That is, in a case where the user usually performs communication in a state where the user's room is tidy but the room happens to be untidy at that time, the video will deviate from the given trend (the situation where the objects are in good order), and the decoration control unit 201 will thus determine that decoration is necessary and perform decoration of a display object such that the decorated display object is consistent with the usual trend.

When there is Difference from the Real

The decoration control unit 201 performs decoration if a user is in a situation different from a case where the user is actually meeting a communicatee in real space (for example, when the user is dressed well and wears makeup at the office, but the user has bed hair and/or is not wearing makeup when the user is connected to the office from the user's home in telework). The decoration control unit 201 may record, for example, the way the user is dressed or a facial image for when the user goes outside, and determine whether or not the appearance of the user in network communication deviates from the usual trend to determine whether or not decoration is needed. Furthermore, the decoration control unit 201 may determine whether or not decoration is needed based on whether or not preparation of the body of the user satisfies a predetermined body preparation standard (for example, whether or not the user wears makeup and/or whether or not the user is in loungewear or outing wear) that has been set.

When there is Inconsistency with Aim of Communication

The decoration control unit 201 may perform decoration if the aim of network communication (for work, private communication, or the like) is inconsistent with a state of a user or space where the user is present. Information related to a state of consistency with the aim may be set beforehand as decoration rules, and for example, a supposed rule related to outfits may be that in network communication for work, hooded sweatshirts, sweatsuits, jerseys, and the like are not suitable and are changed to other outfits, such as collared shirts and knitwear.

Specific examples of the trigger for change have been described above, but the embodiment is not limited to these examples, and for example, a user may specify a display object beforehand or in real time.

The gazing state determining unit 202 determines a gazing state and a non-gazing state of a communicatee for a display object. For example, the gazing state determining unit 202 determines a gazing state or a non-gazing state of a user for a display object, based on a line-of-sight recognition result acquired from the information processing terminal 10.

Communication Unit 210

The communication unit 210 is connected to the network 30 wiredly or wirelessly, and performs transmission and reception of data to and from each information processing terminal 10 via the network 30. The communication unit 210 is connected to the network 30 for communication by, for example, a wired/wireless local area network (LAN) or wireless fidelity (Wi-Fi) (registered trademark).

User DB 220

The user DB 220 accumulates therein information related to users. For example, the information accumulated therein includes: a communication history of a user (spoken voice, a video, a communicatee, a communication aim, and the like); outfits of and makeup on the user upon communication; a trend of the appearance of the surroundings; and the user's tastes and preferences, what the user is particular about, and the user's characteristics (sensitivity to change and the like).

Decoration Rule DB 230

The decoration rule DB 230 has accumulated therein rules prescribing conditions under which the decoration according to the embodiment is to be performed.

The user DB 220 and the decoration rule DB 230 are stored in a storage unit (not illustrated in the drawings) provided in the server 20. The storage unit is implemented by a ROM storing therein programs, arithmetic parameters, and the like to be used in processing by the control unit 200, and a RAM temporarily storing therein parameters and the like that change as appropriate.

The configuration of the server 20 according to the embodiment has been described specifically above. The configuration of the server 20 illustrated in FIG. 5 is just an example, and the embodiment is not limited to this example. For example, at least a part of the configuration of the server 20 may be in an external device, or at least a part of the functions of the control unit 200 may be implemented by the information processing terminal 10 or an information processing device (for example, a so-called edge server) comparatively close in communication distance to the information processing terminal 10. As described above, by distribution of the components of the server 20 as appropriate, processing is able to be performed in real time even more, the processing load is able to be reduced, and the security is able to be provided.

Furthermore, the components of the control unit 200 and the DBs illustrated in FIG. 5 may all be provided in the information processing terminal 10, and the information processing system according to the embodiment may be implemented by an application in the information processing terminal 10. That is, the system may be configured such that the information processing terminals 10 of users performing communication are connected to each other for the communication. In this case, decoration of a display object desired to be hidden from the communicatee is controlled as appropriate by one or both of the information processing terminals 10.

3. OPERATION PROCESSING

Figure 7:
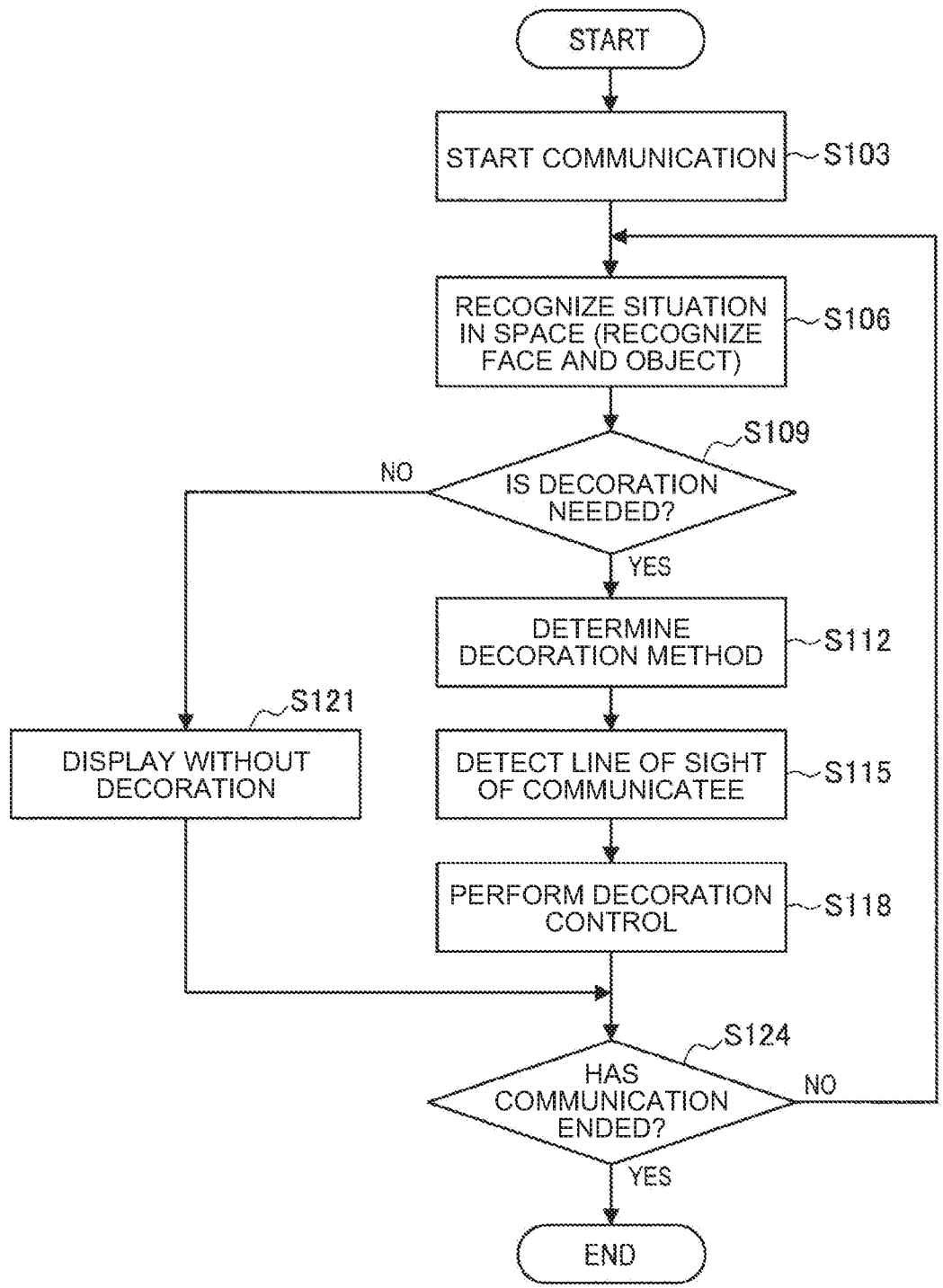
FIG. 7 is a flow chart illustrating an example of a flow of the decoration control in operation processing according to the embodiment of the present disclosure.

Next, operation processing according to the embodiment will be described by reference to FIG. 7. FIG. 7 is a flow chart illustrating an example of a flow of the decoration control in the operation processing according to the embodiment.

As illustrated in FIG. 7, firstly, the server 20 starts communication between users via a network (Step S103).

Subsequently, the server 20 performs recognition of a situation in space (Step S106). For example, based on information acquired from each space (a captured image, depth sensor data, and/or the like), the server 20 performs recognition of the position and the face of a user present in the space, recognition of objects, and the like. The recognition of the situation in the space may be performed by each information processing terminal 10.

Subsequently, the server 20 determines whether or not decoration is needed (Step S109). For example, the server 20 determines that decoration is needed, if there is a difference from the situation in the usual network communication, if there is a difference from the case where the user is actually meeting the communicatee, or if there is inconsistency with the communication aim. Or, if an instruction to execute decoration has been input by the user, the server 20 determines that decoration is needed.

Subsequently, if it is determined decoration is needed (Step S109/Yes), the decoration control unit 201 determines a method of decoration control (Step S112). Examples of the method of decoration control include, as described above: decoration control according to a gazing state of a communicatee (with presentation of an attracting object, or the like); decoration control based on the order estimated according to the visual attraction; decoration control according to affinity; and decoration control according to characteristics of the communicatee, such as the communicatee's sensitivity to change, and whether the communicatee is particular about interior decorations. The decoration control unit 201 may specify a preset method of decoration control, may specify an appropriate method of decoration control according to the situation, or may specify an appropriate combination of plural methods of decoration control. For example, the decoration control unit 201 may determine that decoration control according to a gazing state of the communicatee is to be performed; and present an attracting object if the communicatee is paying attention to a region around a display object, start decoration in ascending order of visual attraction after presenting an attracting object if there are plural display objects that need to be decorated, and/or further adjust the amount of change in consideration of the affinity and sensitivity.

Subsequently, if the determined method of decoration control is a method where line-of-sight information of the communicatee is used, the server 20 detects a line of sight of the communicatee (Step S115). Specifically, the gazing state determining unit 202 determines a gazing state/non-gazing state for a display object on the communicatee side.

Subsequently, the decoration control unit 201 of the server 20 performs decoration control for the display object (change of the appearance of the display object) (Step S118).

On the contrary, if it is determined that decoration is not needed (Step S109/No), the server 20 outputs a video of the user's space to a display device in space of the communicatee without performing decoration of a display object (Step S121).

The above described processing at Steps S106 to S121 is repeated until communication is ended (Step S124).

An example of the operation processing according to the embodiment has been described above. The operation processing illustrated in FIG. 7 is just an example, and the present disclosure is not limited to the example illustrated in FIG. 7. For example, the present disclosure is not limited to the order of steps illustrated in FIG. 7. At least some of the steps may be processed in parallel or processed in the reverse order. For example, the processing at Step S115 and the processing at Step S112 may be performed in parallel, or may be performed in the reverse order.

Furthermore, not all of the processing illustrated in FIG. 7 is necessarily executed.

Furthermore, not all of the processing illustrated in FIG. 7 is necessarily performed by a single device. For example, the processing may be performed by plural devices, such that the processing at Step S103 to Step S106 and Step S118 is performed by the information processing terminal 10 and the processing at Step S109 to Step S115 is performed by the server 20.

Furthermore, the steps illustrated in FIG. 7 are not necessarily performed sequentially over time. For example, the situation recognition processing at Step S106 may be performed continuously and the processing at Steps S109 to S118 may be performed in parallel with the situation recognition processing.

4. SUPPLEMENTS

Next, supplements will be added for the embodiment.

Supplement for Decoration Target

Without being limited to the decoration of users' faces and objects, the decoration control unit 201 may erase characteristics or habits of actions of the users. For example, the decoration control unit 201 may change the state of a user to a state where the user has lowered her hands by erasing her action, such as the user playing with her hair, the user playing with her nails, the user folding her arms, or the user shaking her legs. The change to the state where the hands have been lowered is preferably controlled such that the state is naturally led from and to the user's actions before and after. Furthermore, clicking of the user's tongue, verbal tics, and the like may be hidden by household noises, other noises, and the like.

The decoration control unit 201 may decorate the voice of a user. For example, the usual voice of a user is recorded beforehand, and output of the user's voice is adjusted depending on the situation and/or the communicatee. As a result, even if the user has a bad throat due to a cold, for example, the user's voice is able to be presented to the communicatee in a state where the voice has been processed into the usual voice.

Furthermore, the decoration control unit 201 may output a user's voice that has been processed into voice suitable for the atmosphere in that communication. For example, even if the user is low in spirits, in communication where conversation in a tone low in spirits is unsuitable (for example, for work), the user's voice may be output in high pitch and/or the speech rate may be increased, so that the user appears to be higher in spirits. In addition, for communication with a business partner, the decoration control unit 201 may convert the user's voice to be in a calmer tone.

Furthermore, the decoration control unit 201 may attract the attention of a communicatee by presenting other sound if a user's voice is conspicuous, to mask a change to the user's voice.

Attraction of Line of Sight by Sound

The case where an attracting object is presented as a method of diverting the attention of a communicatee has been described above, but the embodiment is not limited to this case, and sound information having a sound image localized at a position spaced apart from a target may be output, for example. For example, if the information processing terminal being used by the communicatee is a wearable device, such as an HMD, attention may be drawn to a direction different from a display object by means of a sound that has been spatially oriented.

Dimming Control

The decoration control unit 201 may control dimming when a display object is changed so that the change is difficult to be seen. For example, when a display object is changed, light on the whole screen may be changed from that of a fluorescent lamp to that having the color of indirect lighting such that the change becomes inconspicuous. Furthermore, the decoration control unit 201 may make a display object difficult to be seen by dimming a region around the display object, instead of decorating the display object.

Determination of Target to be Hidden and Level of Hiding

The decoration control unit 201 may determine whether to change a display object gradually or change the display object immediately, according to importance of the display object. For example, confidential documents have high importance and are thus preferably hidden immediately (changed immediately) even if the change may seem somewhat unnatural to a communicatee.

Furthermore, the decoration control unit 201 may determine a display object to be dynamically decorated, according to a person who has attended the communication or the relationship to the person. For example, if a boss has joined communication between two people who are a user and the user's colleague, the decoration control unit 201 decorates the user to be in clothes suitable for communication with the boss, without being noticed by the colleague and the boss.

5. CONCLUSION

As described above, in the information processing system according to the embodiment of the present disclosure, display of real space is able to be changed (by an awkward part being hidden through virtual decoration of a person or an object present in the real space) without being noticed by a communicatee (without seeming strange to the communicatee).

A preferred embodiment of the present disclosure has been described in detail above by reference to the appended drawings, but the present techniques are not limited to this example. It is evident that a person having ordinary skill in the technical field of the present disclosure can derive various modified examples or revised examples within the scope of the technical ideas written in the patent claims, and it is understood that these modified examples or revised examples also rightfully belong to the technical scope of the present disclosure.

For example, a computer program may be generated, the computer program being for hardware, such as the CPU, ROM, and RAM incorporated in the above described information processing terminal 10 or server 20, to achieve the functions of the information processing terminal 10 or server 20. Furthermore, a computer readable storage medium having the computer program stored therein is also provided.

Furthermore, the effects described in this specification are just explanatory or exemplary, and are not limiting. That is, the techniques according to the present disclosure may achieve other effects evident to those skilled in the art from the description in this specification, in addition to the above described effects or instead of the above described effects.

The present techniques may also include the following configurations.

(1)

An information processing device, comprising:
a determining unit that determines a gazing state or a non-gazing state of a first user present in first real space, for a display object displayed by a display device of the first user, the display object being associated with second real space different from the first real space; and
a display control unit that changes appearance of the display object when the gazing state has been changed to the non-gazing state.

(2)

The information processing device according to (1), wherein the display control unit gradually changes the appearance of the display object every time the gazing state is changed to the non-gazing state.

(3)

The information processing device according to (1), wherein the display control unit gradually increases the amount of change to the appearance of the display object according to elapse of time.

(4)

The information processing device according to (1) or (2), wherein the display control unit changes the appearance of the display object when the first user is in the non-gazing state for the display object, after performing control to output an attracting region at a position spaced apart from the display object, the attracting region being for attracting a line of sight of the first user.

(5)

The information processing device according to (4), wherein generation of the attracting region is display of an attracting object at a position spaced apart from the display object or control for increasing visual attraction of a region spaced apart from the display object.

(6)

The information processing device according to any one of (1) to (3), further comprising:
a sound control unit that outputs sound information having a sound image localized at a position spaced apart from the display object, wherein
the display control unit changes the appearance of the display object when the first user is in the non-gazing state for the display object, after the sound information has been output.

(7)

The information processing device according to any one of (1) to (6), wherein the determining unit determines the gazing state or non-gazing state of the first user for the display object, based on a line of sight of the first user or an orientation of the first user's face or head.

(8)

The information processing device according to any one of (1) to (7), wherein the display control unit makes change from a part assumed to be difficult for the first user to recognize the change.

(9)

The information processing device according to (8), wherein the display control unit makes change, among a plurality of the display objects, in order from the display object lower in visual attraction.

(10)

The information processing device according to (8), wherein the display control unit makes change, among a plurality of the display objects, from a region longer in spatial distance from a gaze point of the first user.

(11)

The information processing device according to (8), wherein when the display object is a person, the display control unit makes change from a part other than the person's face.

(12)

The information processing device according to (8), wherein when the display object is something other than a person, the display control unit makes change from a part that is at an end of an angle of view displayed by the display device.

(13)

The information processing device according to any one of (1) to (12), wherein the display control unit controls the amount of change according to whether or not the display object looks familiar to the first user.

(14)

The information processing device according to any one of (1) to (13), wherein the display object is a real object imaged in the second real space.

(15)

The information processing device according to any one of (1) to (14), wherein the display control unit adjusts the amount of change to the display object according to sensitivity of the first user to change.

(16)

The information processing device according to (14), wherein when the appearance of the real object is in a state deviated from a given trend, the display control unit performs control for changing the appearance of the display object such that the changed appearance fulfills the given trend.

(17)

An information processing method, wherein a processor performs processing including:

determining a gazing state or a non-gazing state of a first user present in first real space, for a display object displayed by a display device of the first user, the display object being associated with second real space different from the first real space; and changing appearance of the display object when the gazing state has been changed to the non-gazing state.

(18)

A recording medium that has, recorded therein, a program for causing a computer to function as:

a determining unit that determines a gazing state or a non-gazing state of a first user present in first real space, for a display object displayed by a display device of the first user, the display object being associated with second real space different from the first real space; and a display control unit that changes appearance of the display object when the gazing state has been changed to the non-gazing state.

REFERENCE SIGNS LIST

1 INFORMATION PROCESSING SYSTEM
10 INFORMATION PROCESSING TERMINAL
20 SERVER
30 NETWORK
100 CONTROL UNIT
101 LINE-OF-SIGHT RECOGNITION UNIT
102 SOUND CONTROL UNIT
103 DISPLAY CONTROL UNIT
110 INPUT UNIT
111 CAMERA
112 MICROPHONE
113 LINE-OF-SIGHT SENSOR
120 OPERATION INTERFACE (I/F)
130 OUTPUT UNIT
131 DISPLAY
132 SPEAKER
140 COMMUNICATION UNIT
150 STORAGE UNIT
200 CONTROL UNIT
201 DECORATION CONTROL UNIT
202 GAZING STATE DETERMINING UNIT
210 COMMUNICATION UNIT
220 USER DB
230 DECORATION RULE DB

The invention claimed is:

1. An information processing device, comprising:
a determining unit configured to determine one of a gazing state or a non-gazing state of a first user present in a first real space, for a first display object displayed by a display device of the first user,
wherein the first display object is associated with a second real space different from the first real space; and
a display control unit configured to:
control output of an attracting region at a position spaced apart from the first display object, to attract a line of sight of the first user to the attracting region; and
change an appearance of the first display object based on the output of the attracting region and the determination of the non-gazing state.

2. The information processing device according to claim 1, wherein the display control unit is further configured to gradually change the appearance of the first display object every time the gazing state is changed to the non-gazing state.

3. The information processing device according to claim 1, wherein the display control unit is further configured to gradually increase, based on an elapse of a specific time, an amount of the change in the appearance of the first display object.

4. The information processing device according to claim 1, wherein the output of the attracting region includes one of display of an attracting object at the position spaced apart from the first display object or increase in visual attraction of a region spaced apart from the first display object.

5. The information processing device according to claim 1, further comprising a sound control unit configured to output sound information having a sound image localized at the position spaced apart from the first display object, wherein
the display control unit is further configured to change the appearance of the first display object based on the determination of the non-gazing state for the first display object, and
the change in the appearance of the first display object is subsequent to the output of the sound information.

6. The information processing device according to claim 1, wherein the determining unit is further configured to determine the one of the gazing state or the non-gazing state of the first user for the first display object, based on one of the line of sight of the first user, an orientation of a face of the first user, or an orientation of a head of the first user.

7. The information processing device according to claim 1, wherein the change in the appearance of the first display object is difficult to be recognized by the first user.

8. The information processing device according to claim 7, wherein
the display control unit is further configured to change an appearance of a second display object of a plurality of display objects associated with the second real space,
the first display object has a visual attraction lower than that of the second display object,
the change in the appearance of the second display object is subsequent to the change in the appearance of the first display object, and
the plurality of display objects includes the first display object.

9. The information processing device according to claim 7, wherein
the display control unit is further configured to change an appearance of a second display object of a plurality of display objects associated with the second real space, a spatial distance of the first display object from a gaze point of the first user is longer than a spatial distance of the second display object from the gaze point, the change in the appearance of the second display object is subsequent to the change in the appearance of the first display object, and the plurality of display objects includes the first display object.

10. The information processing device according to claim 7, wherein the first display object corresponds to a second user present in the second real space, and the display control unit is further configured to change an appearance of a part of the second user different from a face of the second user.

11. The information processing device according to claim 7, wherein the first display object is different from a second user present in the second real space, and the display control unit is further configured to change the appearance of the first display object that is at an end of an angle of view displayed by the display device.

12. The information processing device according to claim 1, wherein the display control unit is further configured to control an amount of the change based on whether the first display object looks familiar to the first user.

13. The information processing device according to claim 1, wherein the first display object is a real object imaged in the second real space.

14. The information processing device according to claim 1, wherein the display control unit is further configured to adjust an amount of the change in the appearance of the first display object based on sensitivity of the first user to change.

15. The information processing device according to claim 13, wherein in a case where an appearance of the real object is in a state deviated from a given trend, the display control unit is further configured to change the appearance of the first display object such that the changed appearance fulfills the given trend.

16. An information processing method performed by a processor, the information processing method comprising:

determining one of a gazing state or a non-gazing state of a user present in a first real space, for a display object displayed by a display device of the user,
wherein the display object is associated with a second real space different from the first real space;

controlling output of an attracting region at a position spaced apart from the display object, to attract a line of sight of the user to the attracting region; and changing an appearance of the display object based on the output of the attracting region and the determination of the non-gazing state.

17. A non-transitory computer-readable medium having stored thereon computer-executable instructions, which when executed by a processor, cause the processor to execute operations, the operations comprising:

determining one of a gazing state or a non-gazing state of a user present in a first real space, for a display object displayed by a display device of the user,
wherein the display object is associated with a second real space different from the first real space;

controlling output of an attracting region at a position spaced apart from the display object, to attract a line of sight of the user to the attracting region; and changing an appearance of the display object based on the output of the attracting region and the determination of the non-gazing state.

18. An information processing device, comprising:

a determining unit configured to determine one of a gazing state or a non-gazing state of a user present in a first real space, for a display object displayed by a display device of the user,
wherein the display object is associated with a second real space different from the first real space;

a sound control unit configured to output sound information having a sound image localized at a position spaced apart from the display object; and a display control unit configured to change an appearance of the display object based the determination of the non-gazing state for the display object,
wherein the change in the appearance of the display object is subsequent to the output of the sound information.

* * * * *